United States Patent [19]

Takayama et al.

[11] 4,398,449
[45] Aug. 16, 1983

[54] PNEUMATIC SERVO BOOSTER

[75] Inventors: Toshio Takayama, Yokohama; Hiromi Ando, Tokyo, both of Japan

[73] Assignee: Tokico Ltd., Kanagawa, Japan

[21] Appl. No.: 226,173

[22] Filed: Jan. 16, 1981

[30] Foreign Application Priority Data

Jan. 21, 1980 [JP] Japan .................. 55-5511

[51] Int. Cl.³ .................................. F15B 9/10
[52] U.S. Cl. ........................... 91/376 R; 91/369 A; 92/165 PR
[58] Field of Search ........... 91/369 A, 369 B, 369 R, 91/376 R; 92/165 R, 165 PR, 166

[56] References Cited

U.S. PATENT DOCUMENTS

| | | | |
|---|---|---|---|
| 1,892,287 | 12/1932 | Pearson et al. | 92/166 |
| 1,951,030 | 3/1934 | Nardone | 92/166 |
| 3,688,647 | 9/1972 | Kytta | 91/369 A |
| 3,937,021 | 2/1976 | Sisco et al. | 91/369 A |
| 4,043,251 | 8/1977 | Ohmi | 91/369 B |
| 4,200,029 | 4/1980 | Ohmi | 91/369 A |
| 4,257,312 | 3/1981 | Ohmi et al. | 91/369 A |
| 4,270,353 | 6/1981 | Thomas et al. | 92/165 PR |
| 4,270,438 | 6/1981 | Thomas | 92/165 PR |
| 4,287,811 | 9/1981 | Katagiri et al. | 91/369 A |

FOREIGN PATENT DOCUMENTS 2009871 6/1979 United Kingdom ........... 91/369 A

*Primary Examiner*—Paul E. Maslousky
*Attorney, Agent, or Firm*—Wenderoth, Lind & Ponack

[57] ABSTRACT

A pneumatic servo booster includes a shell housing consisting of front and rear shells, a valve body slidably extending through an opening formed in the rear shell, a flexible diaphragm connected to the valve body and to the inner circumference of the shell housing to divide the interior of the housing into front and rear chambers, a valve mechanism incorporated in the valve body for controlling the pressure difference between the two chambers, and at least one reinforcing rod extending between front and rear shells and through the two chambers. The valve mechanism comprises a plunger slidably received in the valve body and connected to an input rod, a valve seat formed on the valve body, another valve seat formed on the plunger, and a poppet valve cooperating with the valve seats. A return movement restricting member is slidably mounted on the reinforcing rod and restricts the return movement of the plunger, thereby establishing the rearmost position of the plunger.

4 Claims, 10 Drawing Figures

PRIOR ART

4,398,449

PNEUMATIC SERVO BOOSTER

BACKGROUND OF THE INVENTION

This invention relates to pneumatic servo boosters and, particularly to pneumatic servo boosters of the kind including a shell housing consisting of front and rear shells, a valve body slidably extending through an opening formed in the rear shell, a flexible diaphragm connected to the valve body and to the inner circumference of the shell housing and partitioning the interior of the shell housing into two chambers, a valve mechanism incorporated in the valve body and controlling the pressure difference between the two chambers, and at least one reinforcing rod extending between the front and rear shells and through the interior of the shell housing.

The valve mechanism conventionally comprises a poppet valve, a valve seat formed on the valve body, and another valve seat formed on a plunger which is connected to an input rod and is slidably mounted in the valve body. When the poppet valve is spaced from the valve seat of the valve body and is seated on the valve seat of the plunger, the two chambers in the shell housing are communicated with each other and are maintained at a first referential pressure such as a vacuum pressure, and when the poppet valve engages with the valve seat of the valve body and separates from the valve seat of the plunger, the communication between the two chambers is intercepted and a second referential pressure such as atmospheric pressure is introduced into one chamber, such as the rear chamber, while the other chamber is permanently maintained at the first referential pressure.

In the non-actuated condition of a conventional servo booster of the aforementioned kind, the poppet valve is spaced from the valve seat of the valve body by a predetermined small clearance, and seats on the valve seat of the plunger, whereby the first referential pressure prevails in both chambers. The clearance is defined as the maximum clearance between the poppet valve and the valve seat of the valve body in the return stroke of the servo booster, and thus, it is preferable to increase the clearance for improving the responsiveness of the servo booster in the return stroke. However, in actuating the servo booster it is necessary to firstly take up the clearance, i.e., the clearance constitutes an ineffective stroke in the actuating stroke of the servo booster, thereby deteriorating the responsiveness and the pedal feeling of the servo booster in the actuating stroke.

The reinforcing rod is effective to increase the mechanical strength of the shell housing, and is particularly advantageous when the rear end of the servo booster is secured to a body of a vehicle and a master cylinder of a hydraulic braking system is secured to the front end of the shell housing and is supported thereon in a canti-lever style.

SUMMARY OF THE INVENTION

An object of the present invention is to provide a pneumatic servo booster having an improved responsiveness both in the actuating and return strokes.

The pneumatic servo booster according to the invention comprises a return movement restricting member which cooperates with the reinforcing rod and restricts the return movement of the plunger when the plunger returns to its return position.

Preferably, the return movement restricting member is slidably mounted on the reinforcing rod and, when the valve body returns to its return position, the member engages with a shoulder formed on the rear end portion of the reinforcing rod and with the plunger.

The foregoing and other objects and advantages of the invention will become apparent from the following description and the attached drawings.

DETAILED DESCRIPTION OF THE PREFERRED EMBODIMENTS

Figure 1:
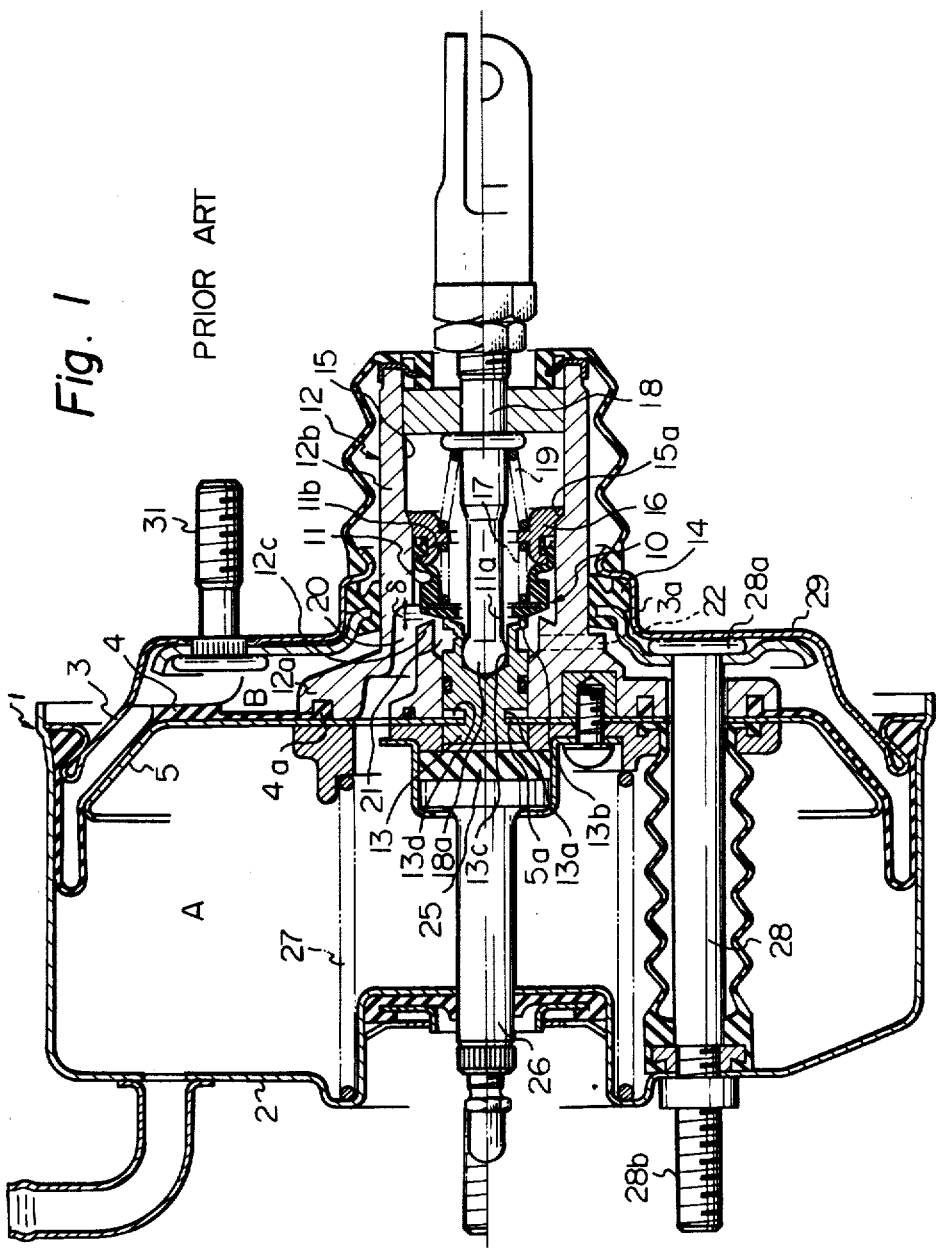
FIG. 1 is a longitudinal sectional view of a prior art servo booster, with the lower half thereof being a vertical cross-section and the upper half thereof being a horizontal cross-section.

FIG. 1 illustrates a typical prior art pneumatic servo booster which comprises a shell housing 1 consisting of front and rear shells 2 and 3, a flexible diaphragm 4 dividing the interior of the housing into two chambers A and B, and a power piston 5 secured to the diaphragm 4. A poppet valve mechanism 10 connects or disconnects communication between the two chambers A and B and communication between the chamber B and the atmosphere. It will be noted that the chamber A is permanently connected with a source of vacuum pressure such as an intake manifold of an engine of a vehicle. The poppet valve mechanism 10 comprises a poppet valve 11, an annular valve seat 12c formed on a valve body 12, and an annular valve seat 13b formed on a plunger 13. The valve body 12 slidably extends through the rear shell 3 and has a large diameter portion 12a on the inner end thereof, to which the inner periphery 4a of the diaphragm 4 is connected. The plunger 13 is slidably fitted in the valve body 12 and is secured to an input rod 18. The relative axial movement of the plunger 13 with respect to the valve body 12 is restricted by the radially inner end 5a of the power piston 5 which is loosely fitted in an annular groove 13a formed in the outer circumference of the plunger 13. It will be noted that the power piston 5 has a non-circular opening to define the inner end 5a. An annular seal 14 is interposed between the rear shell 3 and a small diameter portion 12b of the valve body 12 so as to sealingly and slidably support the valve body 12. The small diameter portion 12b of the valve body 12 has a bore 15 therein, and a spring retainer 16 is fitted in the bore 15 and is retained by a shoulder 15a formed in the bore 15. The spring retainer 16 supports one end 11b of the poppet valve 11 and sealingly urges the one end against the bore 15. The other end 11a of the poppet valve 11 cooperates with the valve seats 12c and 13b. The input rod 18 is rearwardly biassed by a coil spring 19 which is supported on the spring retainer 16.

In the non-actuated condition of the servo booster shown in the drawing, the rearward movement of the plunger 13 is restricted by the inner end 5a of the power piston 5 and a clearance δ is formed between the poppet valve 11 and the valve seat 12c of the valve body 12, while the poppet valve 11 engages with the valve seat 13b of the plunger 13. The chamber B is connected with the chamber A through an axial passage 20 formed in the large diameter portion 12a of the valve body 12, an annular space 21 formed in the valve body 12, and a radial passage 22 formed in the valve body 12.

In actuating the servo booster, the input rod 18 is displaced leftward as viewed in the drawing, and the poppet valve 11 engages with the valve seat 12c after taking up the clearance δ, thereby disconnecting the communication between the chambers A and B. Thereafter, the poppet valve 11 separates from the valve seat 13b of the plunger 13 so that the chamber B is connected with the atmosphere through the radial passage 22, the annular space 21, a space formed in the bore 15 of the valve body 12 and around the input rod 18, an air cleaner, and an opening formed in the rear end of the small diameter portion 12b of the valve body. A pressure difference generates between the chambers A and B, and the power piston 5 and the diaphragm 4 together with the valve body 12 displace leftward. An output force is transmitted through an output rod 26 to such as a piston of a master cylinder (not shown) of a hydraulic braking system of the vehicle. There is provided a reaction disc 25 to transmit the output force from the power piston 5 to the output rod 26 and also to transmit a reaction force to the input rod 18 through the plunger 13.

It will be understood that the responsiveness of the servo booster in the actuating stroke is mainly determined by the maximum lift or the clearance between the valve seat 13b of the plunger 13 and the poppet valve 11 in the actuating stroke, and the responsiveness in the return stroke is mainly determined by the maximum lift or the clearance between the valve seat 12c of the valve body and the poppet valve 11 in the return stroke. In the prior art servo booster shown in the drawing, the maximum clearance between the valve seat 12c and the poppet valve 12 is equal to the clearance δ in the non-actuated condition. However, the clearance δ constitutes an ineffective stroke, in the actuating stroke thereby deteriorating the pedal feeling.

Further, there are provided two reinforcing rods 28 which extend respectively between the front and rear shells 2 and 3 and through the chambers A and B. In this embodiment, the rods 28 pierce through large diameter flange portion 12a of the valve body, the piston plate 5 and an opening of the flexible diaphragm 4. A bellows-like seal member surrounds the rod 28 so as to intercept the communication between the chambers A and B and along the circumference of the rod 28.

The present invention relates to improvements in the prior art pneumatic servo booster as shown in FIG. 1, wherein the clearance δ between the poppet valve and the valve seat of the valve body in the non-actuated condition of the servo booster is decreased as small as possible, thereby improving the pedal feeling, and the clearance in the return stroke of the servo booster is increased as large as possible, thereby improving the responsiveness.

FIGS. 2-7 illustrate a pneumatic servo booster according to the invention and, since the construction is generally similar to the servo booster of FIG. 1, the same numerals have been applied to corresponding parts and detailed descriptions therefor are omitted.

Figure 2:
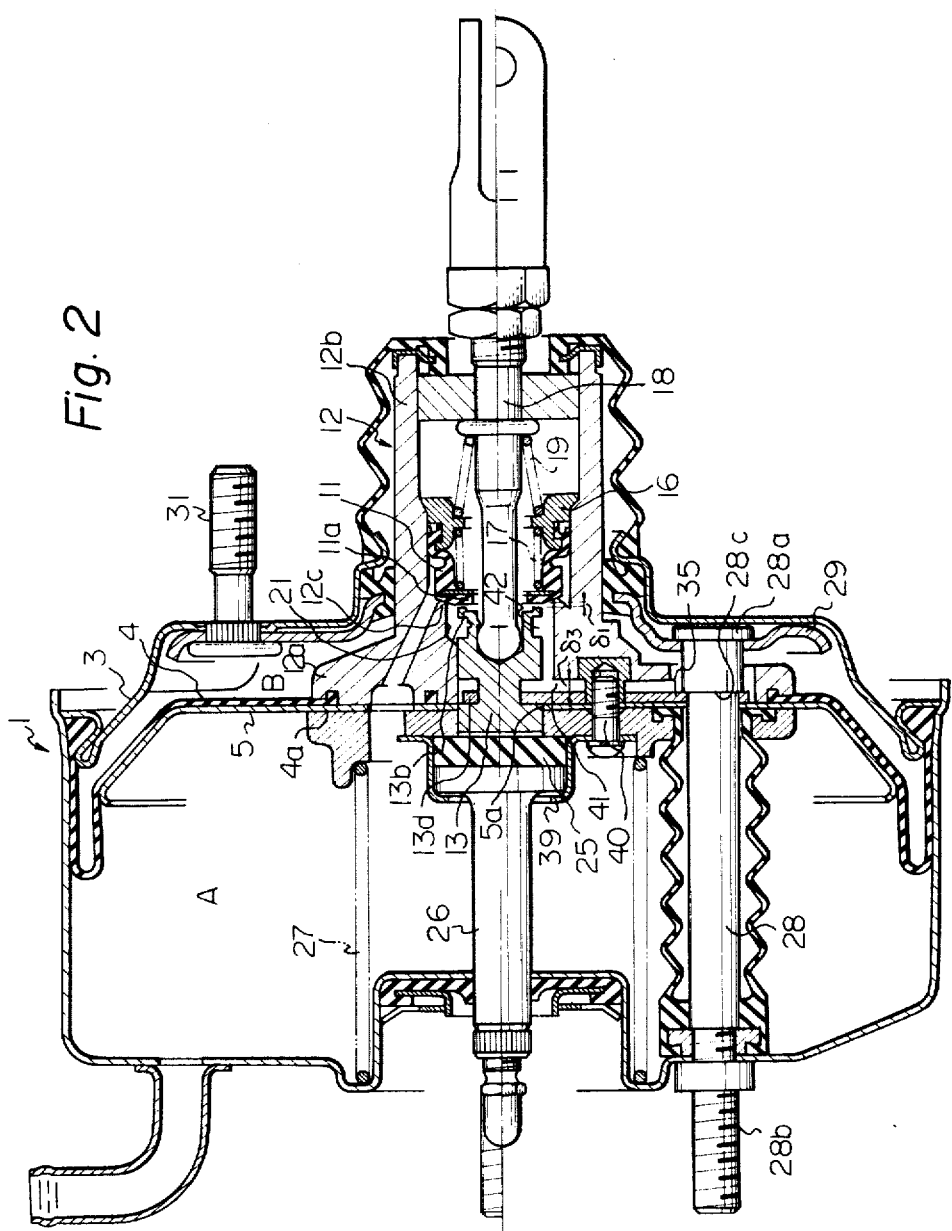
FIG. 2 is a longitudinal sectional view similar to FIG. 1 but showing a first embodiment of the pneumatic servo booster according to the invention.
Figure 6:
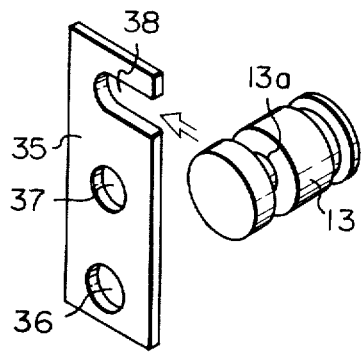
FIG. 6 is a perspective view of the return movement restricting member and the plunger of the first embodiment.

According to the invention, a return movement restricting member 35 is provided to restrict the return movement of the plunger 13 with respect to the housing 1. The return movement restricting member 35 is, as shown in FIG. 6, a generally rectangular rigid plate member having a bore 36 in one end portion, a bore 37 in the mid portion, and a slot 38 in the other end portion. The restricting member 35 is loosely received in a radially extending groove 41 of the large diameter portion 12a of the valve body 12, with the bore 36 loosely receiving therethrough one of the reinforcing rods 28, and the slot 38 receiving the small diameter portion of the plunger 13 which is defined by the annular groove 13a. The bore 37 acts to loosely receive therethrough one of plural tightening screws 40 which secure the power piston 5 and a disc holder 39 with the large diameter portion 12a of the valve body 12. The restricting member 35 can move in the groove 41 in the direction of the axis of the servo booster by a distance $\delta_3$. The reinforcing rod 28 engaging with the bore 36 of the restricting member 35 has a shoulder 28c on the rear end portion, so that when the valve body 12 retracts to its rearmost position as shown in FIG. 2, the restricting member 35 engages with the shoulder 28c and with the power piston 5, thereby restricting the rearward movement of the valve body 12. At that condition, the input rod 18 and the plunger 13 also move rearward due to the spring 19, and the rearward movement is restricted by the restricting member 35 which engages with wall 13d of the annular groove 13a of the plunger 13. A small clearance $\delta_1$ is formed between the poppet valve 11 and the valve seat 13b of the plunger 13. The clearance $\delta_1$ is preferably as small as possible, however, it is essential that the poppet valve 11 is tightly engaged with the valve seat 12c of the valve body 12. Since the return or retracting movement of the plunger 13 is restricted by the restricting member 35, the radially inner end 5a of the power piston 5 does not engage with the annular groove 13a of the plunger 13.

The space 21 defined by the valve seat 12c of the valve body 12, the valve seat 13b of the plunger 13 and the poppet valve 11 is communicated with the chamber B through a passage 42 formed in the valve body 12 and the groove 41 and, also with the atmosphere through the clearance $\delta_1$, the interior of the poppet valve 11 and an opening formed in the rear end of the valve body 12. Thus, in the normal non-actuated condition of the servo booster, the valve body 12 slightly displaces frontward from the position shown in FIG. 2 to take up the clearance $\delta_1$. Such condition is shown in FIG. 3.

It will be noted that the servo booster takes the condition of FIG. 2 only when the booster has been newly assembled, and when the chamber A is connected to a source of vacuum pressure the valve body 12 moves leftward, so that the poppet valve 11 firstly engages with the valve seat 13b of the plunger 13 and, secondly, separates from the valve seat 12c of the valve body 12 thereby exhausting the air in the chamber B to the source of vacuum pressure through the chamber A.

Figure 3:
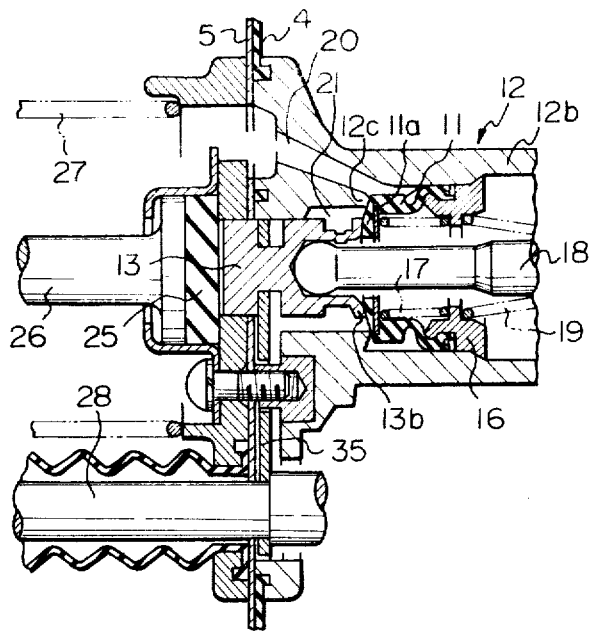
FIG. 3 is a partial sectional view showing the essential portion of FIG. 2 in the non-actuated condition of the servo booster with vacuum pressure being introduced into the booster.

Thereafter, the valve body 12 returns to the condition of FIG. 3.

Figure 4:
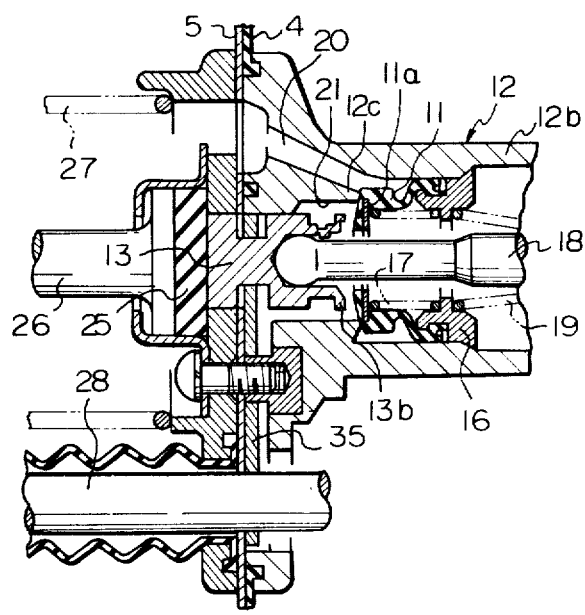
FIG. 4 is a partial sectional view similar to FIG. 3 but showing the condition in the actuating stroke.

At the normal non-actuated condition of FIG. 3, the poppet valve 11 engages with the valve seats 12c and 13b so that the chamber B is isolated both from the chamber A and the atmosphere. When a brake pedal (not shown) of the vehicle is depressed the plunger 13 moves leftward whereby the valve seat 13b of the plunger 13 instantly separates from the poppet valve 11 to introduce the atmospheric air into the chamber B. A differential pressure generates between the chambers B and A, and the servo booster actuates. There is not any ineffective movement of the input rod 18, thus improving the pedal feeling. Such condition is shown in FIG. 4.

Figure 5:
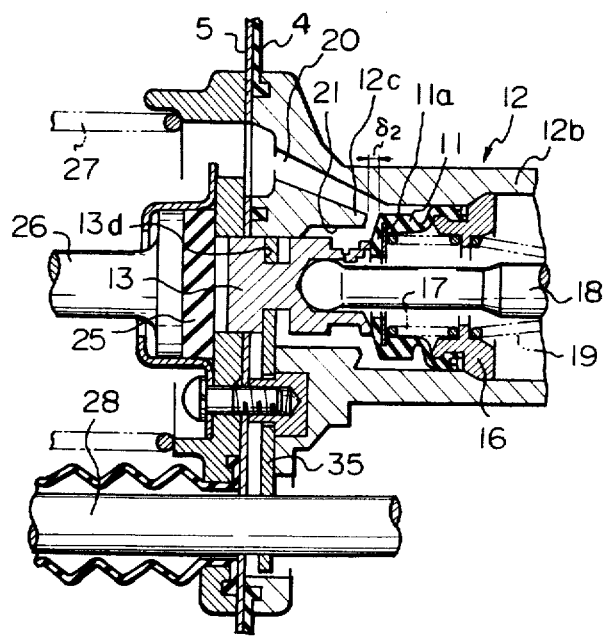
FIG. 5 is a view similar to FIGS. 3 and 4 but showing the condition in the return stroke.

In the return stroke of the servo booster shown in FIG. 5, the restricting member 35 is displaced rearward due to the return movement of the plunger 13, and the maximum lift $\delta_2$ of the poppet valve 11 from the valve seat 12c is substantially defined by the depth of the groove 41, taken in the direction of movement of the valve body 12 minus the thickness of the restricting member 35. Therefore, it is possible to increase the responsiveness of the servo booster in the return stroke as desired. It will be noted that the maximum lift or the clearance $\delta_2$ can be determined as desired irrespective to the ineffective stroke of the prior art servo booster in the actuating stroke.

Figure 7:
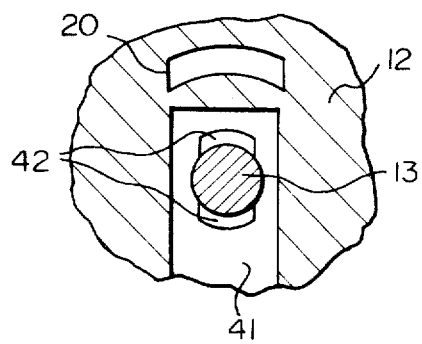
FIGS. 7-9 are explanatory views showing various forms of passages in the servo booster.
Figure 8:
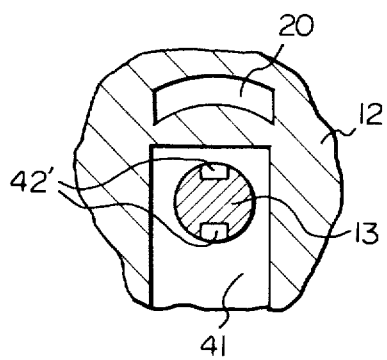
Figure 9:
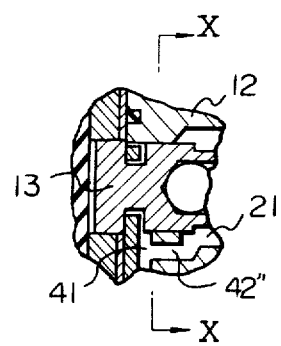
Figure 10:
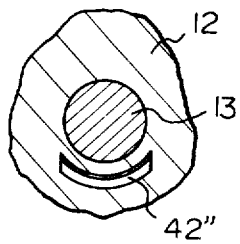
FIG. 10 is a sectional view taken along line X—X in FIG. 9.

FIGS. 7-10 show various arrangements of the passage 42 connecting the space 21 with the chamber B through the groove 41. In FIG. 7, two axially extending passages 42 are formed in the valve body 12 and are partially defined by the outer circumference of the plunger 13. In FIG. 8, passages 42' are defined by axially extending grooves formed in the plunger 13. In FIGS. 9 and 10, an arcuate passage 42'' is formed in the valve body 12 separate from the bore receiving slidably therein the plunger 13.

It will be understood that the invention is applicable not only to so-called vacuum servo boosters as described above, but to other pneumatic servo boosters such as pressure-vacuum servo boosters and pressure-atmospheric pressure servo boosters.

In the illustrated embodiments, two reinforcing rods 28 are provided in a vertical central plane, but the reinforcing rods may be arranged in a horizontal central plane. Further, three or more reinforcing rods may be provided as desired. The restricting member 35 may slidably be mounted on any one of the reinforcing rods.

As described heretofore, according to the invention, a return movement restricting member is axially movably mounted on a reinforcing rod and in the valve body to restrict the return movement of the plunger when the plunger returns to its rearmost position. Accordingly, the poppet valve can engage with the valve seat of the valve body and with the valve seat of the plunger in the normal non-actuated condition of the servo booster, thus improving the pedal feeling in actuating the servo booster and also improving the responsiveness in the return stroke.

What is claimed is:

1. A pneumatic servo booster comprising:
   a shell housing including front and rear shells;
   a valve body slidably extending through an opening formed in said rear shell;
   a flexible diaphragm connected to said valve body and partitioning the interior of said shell housing into a first chamber adapted to be connected to a vacuum source and a second chamber;
   a plunger slidably fitted in a bore in said valve body and connected to an input rod extending through a rear end of said valve body;
   a valve mechanism incorporated within said valve body and including a poppet valve within said valve body, a first valve seat on said valve body and a second valve seat on said plunger, said valve mechanism including means for connecting said first and second chambers when said poppet valve is spaced from said first valve seat and seated on said second valve seat;
   said plunger being movable by said input rod in a forward direction away from said poppet valve during an actuating stroke, whereby the servo booster including said valve body actuates in said forward direction, and upon release of the input pressure to said input rod, said plunger moves in a rearward direction toward said poppet valve in a return stroke, whereby the servo booster including said valve body returns in said rearward direction;
   at least one reinforcing rod extending through the interior of said shell housing and between said front and rear shells and fixed thereto; and
   return movement restricting means in cooperation with said reinforcing rod for restricting the return movement of said valve body with respect to said shell housing in said rearward direction, for restricting the return movement of said plunger with respect to said shell housing in said rearward direction, and for defining a normal non-actuated condition of the servo booster such that at a rearwardmost position of said plunger said poppet valve engages with both said first and second valve seats.

2. A servo booster as claimed in claim 1, wherein said return movement restricting means comprises a member slidably mounted on said reinforcing rod, and a shoulder on a rear portion of said reinforcing rod, said member abutting said shoulder and said plunger at said rearwardmost position of said plunger.

3. A servo booster as claimed in claim 2, further comprising an annular groove in the outer periphery of said plunger, said member including a radially inner end received in said annular groove and a radially outer end slidably fitted on said reinforcing rod.

4. A servo booster as claimed in claim 2, wherein said connecting means includes a radial groove in said valve body, and said member loosely extends through said groove.

* * * * *